US006080715A

United States Patent [19]

[11] Patent Number: 6,080,715
[45] Date of Patent: Jun. 27, 2000

Bianchi et al.

[54] GRANULAR COMPOSITIONS OF ∈-PHTHALIMIDO PEROXYHEXANOIC ACID

[75] Inventors: Ugo Piero Bianchi, Verona; Claudio Cavallotti; Claudio Troglia, both of Milan, all of Italy

[73] Assignee: Ausimont S.p.A., Milan, Italy

[21] Appl. No.: 09/002,487

[22] Filed: Jan. 2, 1998

[30] Foreign Application Priority Data

Jan. 3, 1997 [IT] Italy .................................. MI97A0005

[51] Int. Cl.[7] .............................. C11D 3/395; C11D 7/54; C11D 17/06; A01N 3/00

[52] U.S. Cl. .......................... 510/444; 510/375; 510/488; 510/503; 252/186.26

[58] Field of Search .................................... 510/444, 488, 510/503, 375; 252/186.26

[56] References Cited

U.S. PATENT DOCUMENTS

| | | | |
|---|---|---|---|
| 3,267,147 | 8/1966 | Sheeran . | |
| 3,908,045 | 9/1975 | Alterman et al. | 427/213 |
| 4,100,095 | 7/1978 | Hutchins et al. | 252/99 |
| 4,338,216 | 7/1982 | Earl et al. . | |
| 4,686,063 | 8/1987 | Burns | 252/102 |
| 5,258,132 | 11/1993 | Kamel et al. | 252/94 |
| 5,296,156 | 3/1994 | Ploumen et al. | 252/95 |
| 5,399,296 | 3/1995 | Wierenga et al. . | |
| 5,520,844 | 5/1996 | Venturello et al. | 252/186.42 |
| 5,674,828 | 10/1997 | Knowlton et al. | 510/372 |
| 5,712,239 | 1/1998 | Knowlton et al. | 510/372 |
| 5,858,945 | 1/1999 | Lang et al. | 510/224 |

FOREIGN PATENT DOCUMENTS

| | | |
|---|---|---|
| 0 325 289 | 7/1989 | European Pat. Off. . |
| 1 452 943 | 10/1976 | United Kingdom . |

*Primary Examiner*—Yogendra Gupta
*Assistant Examiner*—John M Petruncio
*Attorney, Agent, or Firm*—Nikaido Marmelstein Murray & Oram, LLP

[57] ABSTRACT

Granular compositions comprising ∈-phthalimido peroxyhexanoic acid (PAP), a N-oxide of a tertiary amine surfactant and an organic acid with $PK_a$ lower than 3.5 and soluble in water at most for 1% by weight at a temperature of 20° C.

12 Claims, No Drawings

GRANULAR COMPOSITIONS OF ∈-PHTHALIMIDO PEROXYHEXANOIC ACID

The present invention relates to granules based on percarboxylic acids utilizable in detergent formulations. More specifically it relates to granules based on ∈-phthalimido peroxyhexanoic acid, here called PAP, utilizable in detergent formulations. More particularly it relates to granules which are very effective in bleaching and which maintain the bleaching power during the time, that is after storage.

It is well known that the detergent formulations are suitably prepared with components in granular form to avoid pollution, dusting and irritation phenomena during their processing and their use. In particular in the case of a peracid the granular form allows to suitably safeguard the integrity of the chemical species, by limiting the interaction thereof with the other components of the formulation. It is also known that the bleaching performance given by the peracid depends not only on the chemical composition of the detergent formulation, but also on the chemical composition of the granule containing it.

Granular compositions containing solid organic peracids as bleaching agents for detergent formulations, with improved performances in the case they also contain surfactants, are known in the art. This behaviour is interpreted by recognizing to the surfactants present in the granules the effect to favour the dispersion of the particles percarboxylic acid in the washing bath, so as to determine improved results in bleach. See for instance U.S. Pat. No. 4,126,573. However the addition of a surfactant has the drawback to lessen the bleach action.

In order to obviate this inconvenience it is known in the art adding in the granule composition organic acids soluble in water to compensate the slower action due to the surfactant. From the correct balance of the two components there results the possibility to optimize the overall bleach action. See for instance U.S. Pat. No. 4,374,035. By optimal bleach action it is meant that which removes the clothes stains without causing them any damage, both in the case of white clothes and in the case of coloured clothes.

There was the need to have available PAP-based granules showing the following combination of properties:

- a high content of active principle (PAP),
- a high chemical stability over the time both for the granules as such and for the granules introduced in a detergent formulation, also under severe storage conditions: temperatures generally up to 45° C. and relative humidity up to 80%,
- good bleach performances on various clothes in general, both white and coloured, without causing to the same any damage during the stains removal,
- a good mechanical resistance and therefore handling easiness also on a large scale,
- a suitable behaviour in connection with any even accidental overheating and consequently an economic and easy transportation without limits to the transported amounts,
- an easy processability and therefore the possibility of an economic industrial production on a large scale.

The Applicant has unexpectedly and surprisingly found that when in the PAP-based granules a particular surfactant is utilized in combination with specific carboxylic or sulphonic organic acids, optionally with other auxiliary compounds as specified hereinunder, the combination of the properties indicated above is obtained.

An object of the present invention consists in granules based on ∈-pthalimido peroxyhexanoic acid comprising as a surfactant a N-oxide of tertiary amine and as organic acid an acid with $PK_a$ lower than 3.5 and soluble in water at most for 1% by weight at a temperature of 20° C.

In particular the tertiary amines of which the N-oxides are herein considered, have a linear or branched alkylic chain of 9 to 28 carbon atoms; the other two chains bound to the nitrogen are alkyls and hydroxy alkyls from one to three carbon atoms, preferably methyl or ethyl.

The organic acids which can be mentioned are carboxylic or sulphonic.

p-toluenesulphonic acid and phthalic acid, also differently substituted, can be mentioned.

A preferred organic acid is the ortho-phthalic acid.

The PAP amounts in the granule can range between 20 and 80% by weight, preferably between 40–80%.

The surfactant amount of the invention ranges between 2 and 20% by weight, preferably between 5–10%.

The amount of organic acid is comprised between 2–40% by weight.

The organic peroxyacid PAP and also its use in bleaching are well known in the art, see EP patent 325,289 herein incorporated for reference.

The results of the invention are more surprising if one considers that tests carried out by the Applicant have shown that the semipolar surfactants N-oxide of tertiary amines, which also provide a positive dispersing action in washing, produce an unacceptable effect of lowering the stability to storage of the peroxyacid itself. In particular it has been noticed that granules containing from 2% to 20% by weight of N-oxides of tertiary amines and from 40% to 80% of PAP, as well as other optional inert and binding ingredients, lose a good part of the peroxidic oxygen already in a few days, especially if they are exposed to critical environmental conditions as defined above. It was also observed that the intimate mixture of the two products in the pure state is not chemically stable over the time and therefore the two products are incompatible.

It has been surprisingly found that the compositions of the invention: PAP+N-oxides of tertiary amines surfactant +organic acids as defined above, are stable to storage under severe environmental conditions as well.

The mentioned incompatibility phenomenon is not generally avoided due to the presence of an organic acid, even if in great excess with respect to the N-oxide of the tertiary amine, when the organic acids of the present invention are not utilized.

A further object of the invention consists in that the surfactant of the invention can be utilized under the form of salt with the acids of the invention. It has been found indeed that the salts of the N-oxides of tertiary amines are generally not very soluble in water. Through the formation of such salts also N-oxides of tertiary amines commercially available only as solutions and therefore not readily utilizable as such in the granulation process can be used in the preparation of PAP in granular form. The preparation of such salts is carried out by using the carboxylic or sulphonic acids object of the present invention.

In the formulation of the granular composition containing the essential components of the invention, also additional components for the hexothermic control in the case of undesired overheatings, can be used. To this purpose pentahydrate magnesium sulphate, hydrate calcium lactate, bihydrate calcium sulphate, boric acid, etc. can be mentioned, the boric acid is preferred. These products are generally used in amounts between 3.5 and 35% by weight.

Other optional components which can be added and have the function of stopping the catalytic action of decomposition by heavy metals ions, are chelating and/or sequestering agents in amounts from 0.005 to 5% by weight. Quinoline and its salts, polyphosphates of alkaline metals, picolinic and dipicolinic acid, mono or polyphosphonic acids, preferably for instance 1-hydroxyethylidene-1,1-diphosphonic acid (HEDP), can be mentioned.

Other optional components are the binding agents of polymeric type such as for instance polymers of acrylic acids or copolymers of acrylic acids with maleic acid and/or maleic anhydride, or copolymers of acrylic acids derivatives such as esters and salts; homopolymers of the acrylic acid are preferably used. These components have the purpose to confer superior mechanical properties to the granules; generally they are used in amounts ranging from 0.1 to 5% by weight on the total.

The production of granular compositions of the invention can be obtained by direct mixing of the ingredients as such and granulation of said mixture in equipments well known in the granulation art, by utilizing batch or continuous processes, with subsequent drying of the obtained granules. The dried granules can be subject to screening and/or milling to isolate them in the desired dimensional distribution, what is well known in the detergent technology.

As already said, the granular formulations of the present invention are used in the bleaching detergency field both for industrial and domestic use. The compositions of the present invention are particularly suitable for bleaching, in particular for the removal of stains from any type of cloth, both white and coloured, leaving unchanged the features of the cloth subject to treatment.

The following examples are given only for illustrative purposes but are not limitative of the scope of the present invention.

EXAMPLE 1

In a 10 l commercial granulator Eirich Mod R-02, 0.62 Kg of dry ∈-phthalimido peroxyhexanoic acid (PAP) (titre 96.8%) containing 3.2% of PAC (PAP precursor, reaction product of caprolactam and phthalic anhydride in the presence of water), see the Italian patent applications MI95 A002718 and MI95 A002717 for preparing PAP, and then 0.3 kg of o-phthalic acid and 0.8 kg of N-oxide of cetyldimethylamine are introduced.

The mixture is homogenized for 1 minute. Then during two minutes with running chopper (high speed turbine included in the granulator Eirich Mod R-02), 0,098 kg of an aqueous solution containing 2.5 g of DEQUEST® 2010 (1-hydroxyethyliden-1,1-diphosphonic acid (HEDP) at 40% by weight) are introduced.

The granulated mass is dried in an Aeromatic fluid bed with air at 60° C. The obtained product is screened and the fraction between 0.25 mm and 1.40 mm is collected.

0.61 kg of product of the desired granulometry are obtained. The produced granules are not sufficiently resistant from the mechanical point of view and easily crumble when they are subject to strong operations (for instance to pneumatic transport).

stability test: no loss of Active Oxygen after 7 days at room temperature (iodometric titration).

bleaching test: POSITIVE (on Eriochromium Black aqueous solution with 2% by weight of $Na_2CO_3$, standing still, at room temperature).

bleaching test repeated after storage for one month at room temperature: POSITIVE (as above).

EXAMPLE 2

In a 150 l Loedige Model FKM-150 granulator, 17.00 Kg of dry PAP mixture (titre: 96%, containing 4% of PAC) prepared according to the methods reported in Example 1; 5.65 kg of o-phthalic acid, 2.00 kg of boric acid, 2.00 kg of N-oxide of Example 1, are introduced.

The mixture is homogenized for 1 minute.

Then are introduced in the mass, during three minutes, under stirring and with running chopper, 3.37 kg of an aqueous solution obtained by mixing of 3.3 kg of ACUMER® 1510 (polyacrylic acid PAA at 25% by weight, molecular weight PM 60,000) and 0.07 kg of DEQUEST® 2010.

An humid granulated mass is thus obtained which is dried in an Aeromatic fluid bed with an air flow heated to 60° C. After such drying, one proceeds to screening, obaining 19.5 kg of granules with particle size comprised between 0.25 mm and 1.40 mm and with optimal characteristics of mechanical resistance.

stability test: no loss of Active Oxygen after 7 days at room temperature (iodometric titration).

bleaching test: POSITIVE (on Eriochromium Black in aqueous solution at 2% by weight of $Na_2CO_3$, standing still, at room temperature).

bleaching test repeated after storage over one month at room temperature: POSITIVE (as above).

EXAMPLE 3 (comparative)

One operates with the equipments and procedure of Example 2, but the o-phthalic acid is not fed to the system. The chemical composition of the obtained granules is (by weight): (PAP+PAC) 61%, N-oxide of Ex. 1 8%, boric acid 28%, PAA 3%, HEDP 0.1%.

stability test: loss of 50% od Active Oxygen after 7 days at room temperature (iodometric titration).

bleaching test: POSITIVE (on Eriochromium Black in aqueous solution at 2% by weight of $Na_2CO_3$, standing still, at room temperature).

bleaching test repeated after storage for one month at room temperature: NEGATIVE (as above).

EXAMPLE 4 (comparative)

One operates with the equipments and procedure of Example 2, but adipic acid instead of the o-phthalic acid is fed to the system.

stability test: loss of 25% od Active Oxygen after 7 days at room temperature (iodometric titration).

bleaching test: POSITIVE (on Eriochromium Black in aqueous solution at 2% by weight of $Na_2CO_3$, standing still, at room temperature).

bleaching test repeated after storage for one month at room temperature: NEGATIVE (as above).

EXAMPLE 5

One operates with the equipments and procedure of Example 2, but here is fed to the system instead of the N-oxide of Example 2 and of the chemical equivalent of the o-phthalic acid, the corresponding amount of the preformed salt of the ophthalic acid itself with N-oxide of Example 2 and in the same amount of Example 2, previously obtained by reaction in aqueous solution between the two with successive cooling, filtering and drying. The final chemical composition of the system corresponds (in terms of elementary components) to that of Example 2.

stability test: no loss of Active Oxygen after 7 days at room temperature (iodometric titration).

bleaching test: POSITIVE (on Eriochromium Black in aqueous solution at 2% by weight of $Na_2CO_3$, at rest, at room temperature).

bleaching test repeated after storage for one month at room temperature: POSITIVE (as above).

EXAMPLE 6 (comparative)

One operates with the equipments and procedure of Example 2, but neither the N-oxide of Example 1, nor the o-phthalic acid are fed to the system.

The chemical composition (on dry) by weight of the obtained granules is:

(PAP+PAC) 73%, boric acid 23%, PAA 3%, HEDP 0.1%.

stability test: no loss of Active Oxygen after 7 days at room temperature (iodometric titration).

bleaching test: NEGATIVE (on Eriochromium Black in aqueous solution at 2% by weight of $Na_2CO_3$, at rest, at room temperature).

What is claimed is:

1. Granular compositions comprising ∈-pthalimido peroxyhexanoic acid (PAP), a N-oxide of a tertiary amine surfactant and an organic acid with $PK_A$ lower than 3.5 and soluble in water at most for 1% by weight at a temperature of 20° C.

2. Granular compositions according to claim 1 wherein the tertiary amines of which the N-oxide is used have an alkylic linear or branched chain from 9 to 28 carbon atoms, the other two chains bound to the nitrogen are alkyls and hydroxy alkyls from one to three carbon atoms.

3. Granular compositions according to claim 2 wherein in the tertiary amines the other 2 chains bound to the nitrogen are methyl or ethyl.

4. Granular compositions according to claim 1 wherein the organic acid is selected from carboxylic or sulphonic acids.

5. Granular compositions according to claim 4 wherein the organic acid is the ortho-phthalic acid.

6. Granular compositions according to claim 1 wherein the amount by weight of PAP ranges between 20–80%, the surfactant between 2–20%, the organic acid between 2–40%.

7. Granular compositions according to claim 1 wherein the surfactant and the organic acid are in the form of a reaction product salt between the surfactant and the organic acid.

8. Granular compositions according to claim 1 wherein components for the exothermic control are present.

9. Granular compositions according to claim 8, wherein the components for the exothermic control are selected among pentahydrate magnesium sulphate, hydrate calcium lactate, bihydrate calcium sulphate, boric acid.

10. Granular compositions according to claim 8, wherein the component for the exothermic control is boric acid.

11. Granular compositions according to claim 1 characterized in that they contain chelating and/or sequestering agents of the heavy metals ions in amounts from 0.005% to 5% and/or polymeric binding agents in amounts from 0.1% to 5%.

12. A detergent composition comprising ∈-pthalimido peroxyhexanoic acid, an N-oxide of a tertiary amine surfactant and an organic acid having $Pk_a$ lower than 3.5 and its solubility in water at 20° C. is no greater than 1% by weight.

* * * * *